United States Patent [19]
Hiraoka

[11] Patent Number: 5,371,450
[45] Date of Patent: Dec. 6, 1994

[54] CONTROL UNIT CAPABLE OF SMOOTHLY CARRYING OUT A SWITCHING OPERATION BETWEEN POSITION AND PRESSURE FEEDBACK CONTROL SYSTEMS

[75] Inventor: Kazuo Hiraoka, Chiba, Japan

[73] Assignee: Sumitomo Heavy Industries, Ltd., Tokyo, Japan

[21] Appl. No.: 46,718

[22] Filed: Apr. 16, 1993

[30] Foreign Application Priority Data

Aug. 10, 1992 [JP] Japan .................. 4-212928
Aug. 10, 1992 [JP] Japan .................. 4-212929

[51] Int. Cl.$^5$ ............................... B29C 45/77
[52] U.S. Cl. ........................... 318/560; 318/571; 318/632; 425/144; 425/145
[58] Field of Search ............... 318/560–646; 264/40.4, 40.5, 329, 328.13; 425/144, 145, 149; 364/474.35

[56] References Cited

U.S. PATENT DOCUMENTS

| | | | |
|---|---|---|---|
| 3,864,557 | 2/1975 | Sindelar | 318/571 |
| 3,870,445 | 3/1975 | Hold et al. | 425/144 |
| 3,878,372 | 4/1975 | Sindelar | 318/571 |
| 3,937,776 | 2/1976 | Hold et al. | 425/144 |
| 4,094,940 | 6/1978 | Hold | 425/144 |
| 4,311,446 | 1/1982 | Hold et al. | 425/144 |
| 5,232,714 | 8/1993 | Kohno et al. | 425/145 |
| 5,237,509 | 8/1993 | Ueta et al. | 318/632 |

*Primary Examiner*—Paul Ip
*Attorney, Agent, or Firm*—Burns, Doane, Swecker & Mathis

[57] ABSTRACT

A control unit for an injection molding machine comprises a position feedback control system 41, a pressure feedback control system 42, and a velocity minor feedback control system 43 which is used in common to the position and the pressure feedback control systems 41 and 42. A minimum value selector 30-3 selects a smaller one of manipulated variables supplied from the position feedback control system 41 and the pressure feedback control system 42. During pressure control, a position pattern follower 30-4 controls the operation of a position pattern generator 24-2 so as to restart generation of a position pattern at any time.

10 Claims, 8 Drawing Sheets

CONTROL UNIT CAPABLE OF SMOOTHLY CARRYING OUT A SWITCHING OPERATION BETWEEN POSITION AND PRESSURE FEEDBACK CONTROL SYSTEMS

BACKGROUND OF THE INVENTION

This invention relates to a control unit for use in an injection molding machine which is driven by a servo motor and which will be referred to as an electrical injection molding machine hereinunder.

Recently, an electrical injection molding machine of the type described, which is driven by a servo motor in place of a hydraulic actuator, has widely been used to inject a resin material into a mold and to manufacture a molded product. In general, the injection molding machine includes an injection unit driven by the servo motor and a controller coupled to the injection unit and the servo motor to control the servo motor by monitoring the injection unit. The injection unit comprises an injection cylinder provided with a hopper and a screw arranged in the injection cylinder. The screw is directly coupled at its rear end to a drive shaft operatively coupled to an injection motor formed by the servo motor. The servo motor rotates the drive shaft to move the drive shaft forwards and backwards. As a result, the screw reciprocates forwards and backwards along a guide bar. A load cell is mechanically coupled to the drive shaft to detect a pressure imposed on the drive shaft.

Description will hereinafter be given as regards an operation of the injection unit.

(1) A resin material is introduced from the hopper into the injection cylinder and is melted into molten resin. The molten resin is conveyed towards a top end portion of the heat cylinder by a predetermined amount by driving the injection motor. This process is referred to as a measuring process. During the measuring process, the screw is slightly retracted due to a back pressure of the molten resin packed into the top end portion of the injection cylinder. The back pressure is detected by the load cell which produces a pressure detection signal representative of the back pressure. The back pressure is controlled by the use of the pressure detection signal in a manner to be described later.

(2) Then, the drive shaft is driven by the injection motor to be moved forward. A forward end of the screw acts as a piston to inject the molten resin into the mold. This process is referred to as a filling or an injection process. During the injection process, the controller put the screw into a velocity or speed control mode.

(3) At the end of the injection process, the mold is filled with the molten resin. Then, the controller switches a control mode from the velocity control mode into a pressure control mode. Such a switching operation is called a V-P (velocity to pressure) switching operation. The timing and the way of the switching operation seriously affect quality of a molded product.

(4) After the V-P switching operation, the molten resin filled in the mold is cooled and solidified under a predetermined pressure. This process is referred to as a holding process. The pressure applied to the resin is controlled by the controller, like the back pressure.

In the injection unit, the holding process (4) is further succeeded by a next measuring process (1) in a next cycle.

On the other hand, a clamping unit is operated to clamp or close the mold during the holding process (4) which is followed by an ejecting process. In the ejecting process, a molded product which has been cooled and solidified is removed or ejected from the mold by opening the mold and using an ejector mechanism. The mold is thereafter closed again and the ejecting process proceeds to the injection process (2). Thus, the measuring process (1) in the injection unit is carried out simultaneously with the ejecting process in the clamping unit.

In the injection molding machine, it is required to prevent an excessive pressure from being imposed on the mold during the injection process and to suppress a variation of the pressure upon the V-P switching operation.

In the meanwhile, a high-speed injection can not be realized when a load pressure is detected to determine a switching timing on the V-P switching operation due to a time lag which inevitably takes place upon detection of the load pressure. Taking this into account, restriction must be imposed on the injection motor, namely, a drive source during the injection process in some way so as to prevent a filling pressure from exceeding a limit value.

More specifically, when the servo motor is used as the drive source in the injection molding machine, a drive current should be controlled by the controller. In this event, the drive current is often restricted to a predetermined range to control an injection pressure. However, it often happens that the drive current partially exceeds the predetermined range in the velocity or the pressure control mode and that the injection molding machine is put into an uncontrolled state when the drive current exceeds the predetermined range. As a result, control operation is unfavorably affected by disturbance.

At any rate, continuity of an injection pressure can not be kept upon the V-P switching operation. This results in degradation of the quality of the molded product.

SUMMARY OF THE INVENTION

It is therefore an object of this invention to provide a control unit for an injection molding machine, which is capable of smoothly carrying out position feedback control and pressure feedback control without suffering from an influence of disturbance.

It is another object of this invention to provide a control unit for an injection molding machine, which can prevent occurrence of discontinuity in an injection pressure upon velocity-pressure (V-P) switching operation.

Other objects of this invention will become clear as the description proceeds.

A control unit to which this invention is applicable is for use in controlling an injection molding machine which comprises a servo motor controlled by a control signal, a screw driven by the servo motor, a position detector for detecting a position of the screw to produce a position signal representative of the position, and a pressure detector for detecting a pressure imposed on the screw to produce a pressure signal representative of the pressure. According to this invention, the control unit comprises a position pattern generator for successively producing a position pattern signal representative of a reference position of the screw concerned with time, position control means connected to the position detector and the position pattern generator for comparing the position signal value and the position pattern signal to produce a first manipulated variable related to the position, pressure control means for comparing the pressure signal and a predetermined pressure signal representative of a predetermined pressure to produce a second manipulated variable concerned with the pressure, a selector connected to both of the position and the pressure control means for selecting a smaller one of the first and the second manipulated variables as a selected manipulated variable, and supply means for supplying said selected manipulated variable to said servo motor as said control signal.

According to another aspect of this invention, the pressure control means comprises subtracting means for subtracting the predetermined pressure signal from the pressure signal to produce a difference signal representative of a difference between the pressure and the predetermined pressure, and gain adjusting means, having a plurality of gains different from one another, for adjusting the second manipulated variable in response to the difference signal by switching the gain of the gain adjusting means from one to another.

DESCRIPTION OF THE PREFERRED EMBODIMENTS

Figure 1:
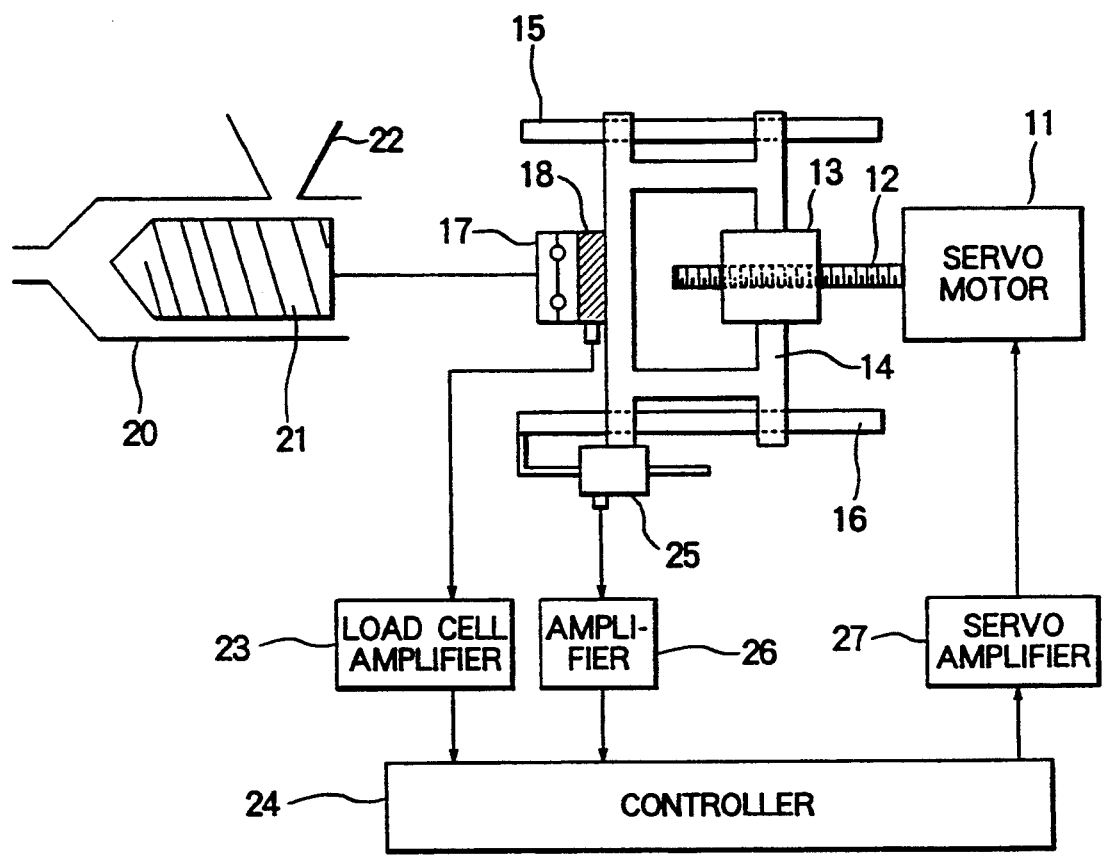
FIG. 1 is a schematic block diagram of an injection unit of a typical injection molding machine.

For a better understanding of this invention, description will at first be made as regards an injection unit of a conventional injection molding machine with reference to FIG. 1.

Referring to FIG. 1, the conventional injection molding machine comprises a servo motor 11 operable as an injection motor, a roller screw 12, and a roller nut 13. The rotation of the servo motor 11 is converted into the linear motion through the roller screw 12 and the roller nut 13 to carry out a filling operation of molten resin. In FIG. 1, the rotation of the servo motor 11 is transmitted to the roller screw 12. With the rotation of the roller screw 12, the roller nut 13 is moved forwards or backwards of FIG. 1. The roller nut 13 is integrally fixed to a slide base 14. The slide base 14 is slidably supported on a pair of guide bars 15 and 16 fixed to a frame (not shown) so as to be moved along the guide bars 15 and 16. With this structure, the slide base 14 conducts a forward or backward movement together with the roller nut 13. The forward or the backward movement of the slide base 14 is transmitted through a bearing 17 and a pressure sensor (namely, a load cell) 18 to a screw 21 in an injection cylinder 20. To the slide base 14, attached is a position sensor 25 for detecting a movement of the screw 21 to produce a position detection signal representative of a position of the screw 21. The position detection signal is given to an amplifier 26 (may be referred to as a first or a position amplifier) and amplified into a first amplified signal which is supplied to a controller 24.

In a measuring process, a resin material is introduced from a hopper 22 into the injection cylinder 20 where the resin material is heated and melted into molten resin.

In an injection process, the screw 21 is moved forwards of FIG. 1 in the injection cylinder 20 to fill a mold (not shown) with the molten resin which has been stored in the injection cylinder 20 curing the measuring process. Then, the molten resin is filled in the mold with a pressure applied thereto. At this time, a reaction force is imposed on the load cell 18 against the pressure applied to the molten resin. The reaction force is detected by the load cell 18 to produce a pressure detection signal representative of a detected pressure value. The pressure detection signal is amplified by a load cell amplifier (which will be called a second amplifier) 23 into a second amplified signal to be supplied to the controller 24.

A preset value is also given to the controller by an operator. Under the circumstances, the controller 24 supplies a servo amplifier 27 with an electric current command which corresponds to each process and which is indicative of a torque of the servo motor 11. In response to the electric current command, the servo amplifier 27 varies a drive current for the servo motor 11 to thereby control an output torque of the servo motor 11.

With the above-mentioned structure, during the injection process, the molten resin is filled in the mold, carrying out velocity feedback control which controls a movement velocity or speed of the screw 12.

During the holding process, the resin in the mold is kept at predetermined pressures by carrying out pressure feedback control by monitoring the reaction force applied on the load cell 18. Thus, both the velocity feedback control and the pressure feedback control should be carried out during the molding operation mentioned above.

Figure 2:
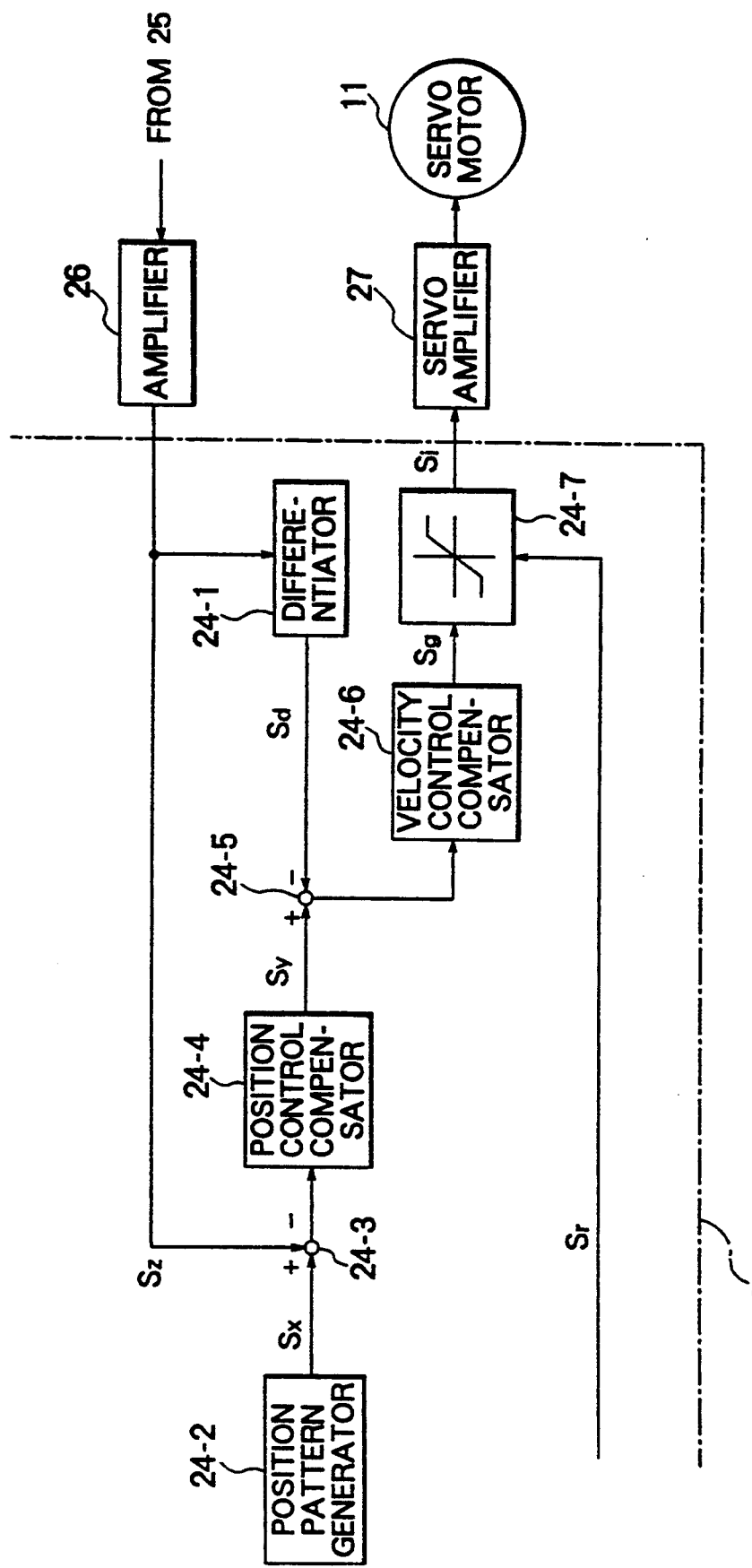
FIG. 2 is a block diagram for describing a structure of a conventional controller which is applied to the injection molding machine illustrated in FIG. 1.

Referring to FIG. 2 in addition to FIG. 1, the controller 24 comprises a differentiator 24-1, a position pattern generator 24-2, a first subtractor 24-3, a position control compensator 24-4, a second subtractor 24-5, a velocity control compensator 24-6, and a current command limiter 24-7.

The position detection signal from the position detector 25 is amplified by the amplifier 26 into a first amplified signal Sz which is supplied to the controller 24. In the controller 24, the first amplified signal Sz is differentiated by the differentiator 24-1 to produce a velocity detection signal Sd which is given by differentiating the position signal by time and which represents a movement velocity of the screw 12 at the position indicated by the first amplified signal Sz. The position pattern generator 24-2 successively produces a position pattern signal Sx representative of a position of the screw in relation to a time. The position pattern signal may be given, for example, by a pulse number produced at a predetermined time interval. The first subtractor 24-3 subtracts the first amplified signal Sz from the position pattern signal Sx to produce a difference signal representative of a difference between Sx and Sz. The difference signal is supplied to the position control compensator 24-4. The position control compensator 24-4 has a predetermined gain and carries out predetermined compensation calculation upon the difference signal to obtain a compensated result and to produce a compensated result signal Sy corresponding to a first manipulated variable y of the second subtractor 24-5. The first manipulated variable y is given by a dimension of velocity and serves as a set value of a velocity feedback control system. The second subtractor 24-5 subtracts the velocity detection signal Sd from the compensated result signal Sy. The second subtractor 24-5 supplies the velocity control compensator 24-6 with a deviation signal representative of a result of subtraction. The velocity control compensator 24-6 has a preselected gain and carries out a preselected compensation calculation upon the deviation signal to obtain a further compensated result and to produce another compensated result signal Sg representative of a previous manipulated variable g of the servo motor 11. The compensated result signal Sg is supplied through a current command limiter 24-7 to the servo amplifier 27 as a limited manipulated variable represented by a controlled manipulated variable signal Si.

A combination of the amplifier 26, the first subtractor 24-3, the position control compensator 24-4 forms a position feedback control system. On the other hand, a combination of the amplifier 26, the differentiator 24-1, the second subtractor 24-5, the velocity control compensator 24-6 forms the velocity feedback control system.

Herein, it is to be noted that the current command limiter 24-7 is controlled by a pressure limitation control signal Sr. The pressure limitation control signal Sr represents a pressure limitation value during an injection speed control process. The current command limiter 24-7 limits a level of the operation signal Sg in correspondence to the pressure limitation set signal Sr and supplies the servo amplifier 27 with the controlled manipulated variable signal Si representative of the limited manipulated variable i. The limited manipulated variable i indicates a current command value, namely, a torque command value for the servo motor 11. Consequently, it is possible to limit the torque produced by the servo motor 11, within a range determined by the pressure limitation signal Sr.

However, the above-described control system of the electrical injection molding machine is disadvantageous as will presently be described.

In the case where the manipulated variable signal Sg has a level greater than that of the pressure limitation signal Sr, any variation of the manipulated variable signal Sg is neglected even when the manipulated variable signal Sg is varied during the velocity feedback control. In other words, when the drive current of the servo motor 11 is restricted in the feedback control system wherein the injection speed is fed back during the injection process, the feedback control is not desirably carried out. As a result, the control system is liable to unfavorably be affected by disturbance.

In such an event, the actual manipulated variable signal Si can be finally determined by the pressure limitation signal Sr alone. This means that open loop control is practically carried out although feedback control or closed-loop control seems to be carried out and that the manipulate variable signal Si becomes less sensitive to the manipulated variable signal Sy. Even if the restriction is imposed on the output torque of the servo motor 11, accurate restriction can not be expected due to the disturbance, such as friction, and a drive mechanism interposed between the servo motor 11 and an actual operating portion on which the injection pressure is imposed.

In this connection, the control operation may be switched from the velocity control system to the pressure control system in a latter part of the injection process. The subsequent filling operation is controlled by the pressure feedback control system like the holding process. However, the continuity of the injection pressure inevitably takes place upon switching from the velocity control system to the pressure control system. This results in degradation of the quality of the molded product.

Figure 3:
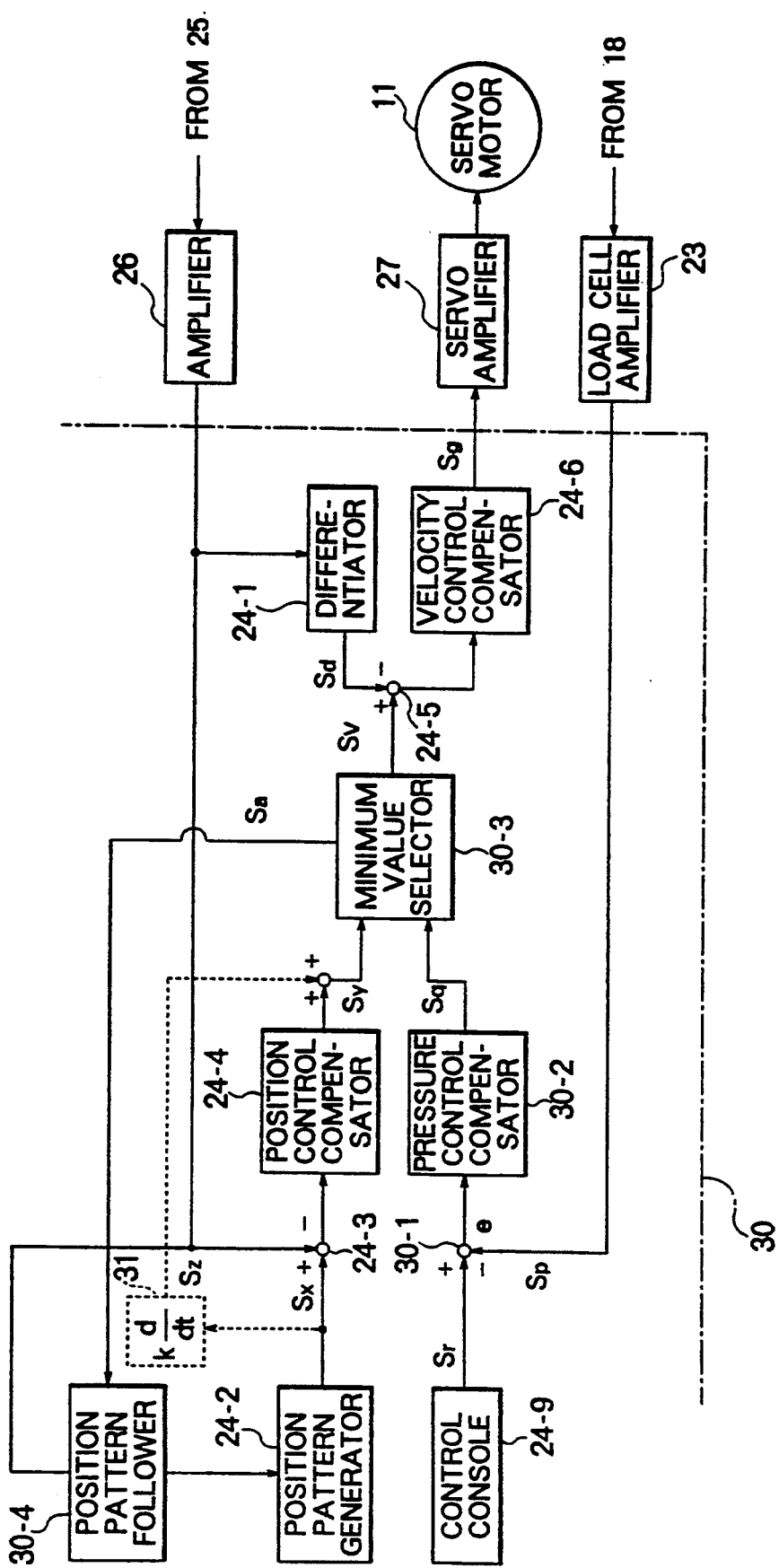
FIG. 3 is a block diagram for describing a structure of a controller of an electrical injection molding machine according to a first embodiment of this invention.

Referring to FIG. 3, description will now be made as regards a first embodiment of this invention. In FIG. 3, similar parts are designated by like reference numerals as those described with reference to FIG. 2. A controller 30 according to this embodiment comprises a position feedback control system similar to the conventional position feedback control system illustrated in FIG. 2 except that the current command limiter 24-7 is omitted. The controller 30 further comprises a pressure feedback control system in addition to the position feedback control system. In the position feedback control system, a position detection signal from a position detector 25 is amplified by an amplifier 26 (first amplifier) to produce a first amplified signal Sz which is supplied to a first subtractor 24-3. The first subtractor 24-3 is also supplied from a position pattern generator 24-2 with a position pattern signal Sx which is representative of a position pattern and which is reproduced in a manner similar to that illustrated in FIG. 2. The first subtractor 24-3 subtracts the first amplified signal Sz from the position pattern signal Sx to produce a first subtraction result signal representative of the result of subtraction. A position control compensator 24-4 carries out a compensation calculation of the first subtraction result signal to produce a first arithmetic result signal Sy representative of a first manipulated variable y of the velocity control compensator 24-6. The first manipulated variable y has a dimension or a unit factor of velocity, as known in the art. On the other hand, in the pressure feedback control system, a pressure detection signal from a load cell 18 is amplified by a load cell amplifier (second amplifier) 23 to produce a second amplified signal Sp. A second subtractor 30-1 subtracts the second amplified signal Sp from a pressure limitation signal Sr to produce a second subtraction result signal representative of the result of subtraction, namely, an error e. In the example being illustrated, the pressure limitation signal Sr is manually given from a control console 24-9. A pressure limitation compensator 30-2 carries out a compensation calculation of the second subtraction result signal to produce a second arithmetic result signal Sq representative of a second manipulated variable q. The second manipulated variable q may be considered as having a dimension or a unit factor equivalent to velocity because the pressure error e can be related to the position of the screw.

The second arithmetic result signal Sq representative of the second manipulated variable q and produced by the pressure limitation compensator 30-2 is supplied to a minimum value selector 30-3. On the other hand, the first arithmetic result signal Sy representative of the first manipulated variable y and produced by the position control compensator 24-4 in the position feedback control system is also supplied to the minimum value selector 30-3.

Herein, a velocity minor feedback control system is formed through the position detector 25, the amplifier 26, a differentiator 24-1, a third subtractor 24-5, a velocity control compensator 24-6, a servo amplifier 27, and a servo motor 11.

The velocity minor feedback control system is used in common to both the position feedback control system and the pressure feedback control system. Each of the first and the second arithmetic result signals Sy and Sq provides a velocity set value or a manipulated variable for the velocity minor feedback control system. The minimum value selector 30-3 selects a smaller one of the first and the second manipulated variables y and q as a selected manipulated variable to produce a velocity set signal Sv representative of the selected manipulated variable. The velocity set signal Sv is supplied to the velocity minor feedback control system. In addition, the minimum value selector 30-3 supplies a position pattern follower 30-4 with a selection result signal Sa indicative of whether the first or the second manipulated variable is presently selected.

Description will proceed to the control operation during the injection process with reference to the structure illustrated in FIG. 3. For brevity of description, let the position control compensator 24-4 and the pressure limitation compensator 30-2 be formed by proportional compensators of gains K0 and K1, respectively. In this event, the first and the second manipulated variables y and q are calculated by:

$$y = K0 \cdot (x - z), \quad (1)$$

$$q = K1 \cdot (r - p), \quad (2)$$

where x represents a position set value which is represented by the position pattern signal Sx and which is indicative of a position at each time instant; z, a screw position detection value represented by the position detection signal Sz; r, a pressure limitation value represented by the pressure limitation signal Sr; p, a pressure detection value represented by the pressure detection signal Sp.

At the beginning of the injection process, the injection pressure is substantially equal to zero because the mold is not filled with the resin at all. Accordingly, a pressure difference or error ($e = r - p$) is extremely large and the second manipulated variable q is also very large, as readily understood from Equation (2). In this situation, the minimum value selector 30-3 selects the first manipulated variable y which is sent from the position feedback control system and which is smaller than the second manipulated variable q. As a result, the injection speed or velocity control is carried out through the position feedback control system at the beginning of the injection process. Under the injection speed control, the injection pressure p is gradually increased as the screw is moved forwards. Consequently, the pressure error ($r - p$) between the pressure limitation value r and the injection pressure p becomes small. With an increase of the injection pressure, the second manipulated variable q gradually becomes near to the first manipulated variable y of the position feedback control system. In other words, the increase of the injection pressure p brings about a reduction of the pressure error ($r - p$).

Thus, the second manipulated variable q becomes equal to the first manipulated variable y.

If the injection pressure p is further increased with the forward movement of the screw, the second manipulated variable q of the pressure feedback control system becomes smaller than the first manipulated variable y of the position feedback control system. As a result, the minimum value selector 30-3 selects the second manipulated variable q to effect a pressure control operation carried out with reference to the pressure limitation value r given as a desired value or command.

During the pressure control operation, it often happens that the injection pressure is decreased due to variation of a molding condition or the injection speed is undesirably decreased in dependence upon the way of setting the injection speed. In such an event, the pressure control operation is returned back to the injection speed control on the above-mentioned condition.

As described above, the injection speed is controlled during the injection process by both the position feedback control and the pressure feedback control systems each of which includes a common velocity minor feedback control system.

In addition, the minimum value selector 30-3 selects, as an output manipulated variable Sv, a smaller one of the manipulated variables Sy and Sq supplied from the position and the pressure feedback control systems. This means that the pressure control can be carried out under the feedback control with a high precision.

Alternatively, a differentiator 31 which multiplies a differential result by a gain K may be incorporated as depicted by a dotted line in FIG. 3. In this case, a feed forward operation is made, as readily understood from FIG. 3, and can be realized without substantial change of structure and function.

It is to be noted that the first manipulated variable y of the position feedback control system is neglected during the pressure limitation control. In this event, if the position pattern generator 24-2 continuously and successively produces a position signal regardless of the pressure limitation control, a position error or difference between the position set value x for the position feedback control system and the screw position detection value z becomes larger and larger with time. If such a state is continued, the first manipulated variable y reaches to an upper limit value allowable in the injection unit and never returns to a level smaller than q.

In order to solve the above-mentioned problem, the selection result signal Sa is supplied from the minimum value selector 30-3 to the position pattern follower 30-4 so as to indicate whether the first manipulated variable y or the second manipulated variable q is selected by the minimum value selector 30-3.

Herein, it is assumed here that the position pattern generator 24-2 successively renews the reference position pattern one at every short time interval t.

Figure 4:
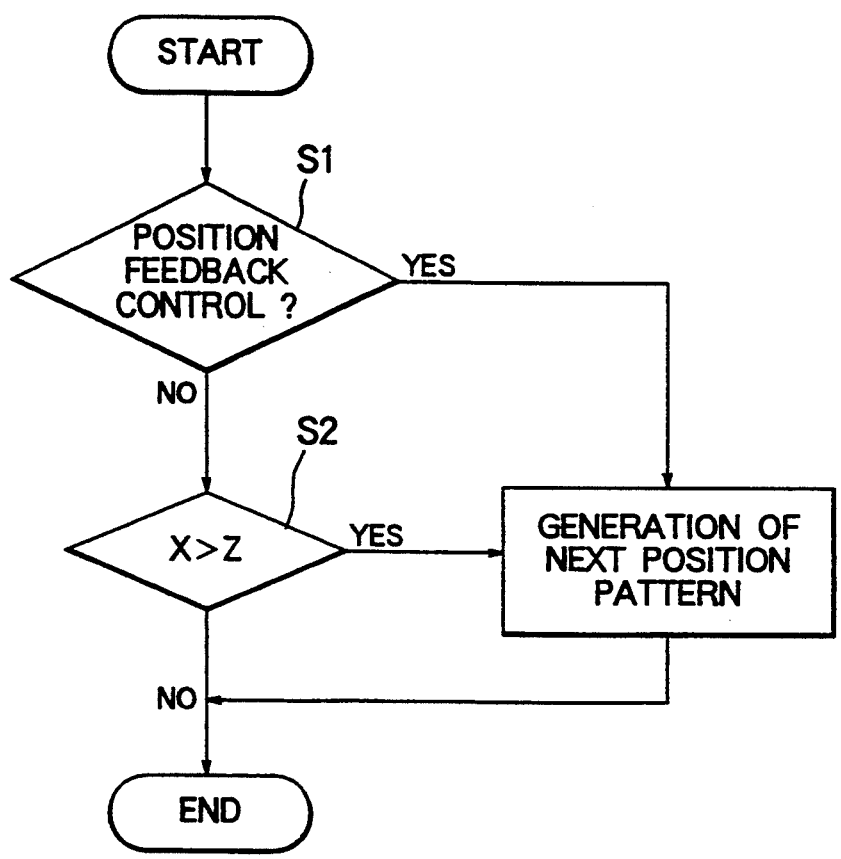
FIG. 4 is a flow chart for describing a control operation of a position pattern follower illustrated in FIG. 3.

Referring to FIG. 4 together with FIG. 3, the position pattern follower 30-4 makes the position pattern generator 24-2 change the reference position pattern to another reference pattern or stop production of the reference position pattern in a manner which will presently be described, after the injection process is started.

More specifically, the position pattern follower 30-4 judges at a first step S1, on the basis of the selection result signal Sa, whether or not the position feedback control is carried out. When the position feedback control is not carried out, the step S1 proceeds to a second step S2.

On the other hand, if it is judged at the first step S1 that the position feedback control is being carried out, the position pattern follower 30-4 makes the position pattern generator 24-2 generate the next position pattern before the operation is brought to an end.

At the second step S2, the position pattern follower 30-4 judges, during the pressure control operation, whether or not the position set value x in the latest position pattern is smaller than the screw position detection value z. When the position set value x is smaller than the position detection value z, the operation directly goes to the end. Otherwise, the position pattern follower 30-4 makes the position pattern generator 24-2 generate the next position pattern before the operation is brought to the end.

It is noted here that the position set value x and the position detection value z gradually become small as the screw is moved forwards along the injecting direction.

As described above, the position pattern follower 30-4 makes the position pattern generator 24-2 generate the position pattern even during the pressure limitation control. As a result, the pressure limitation control is changed to the position feedback control even when the pressure limitation control is carried out. Thus, the control system can be smoothly switched from the position feedback control to the pressure limitation control and vice versa in dependence upon molding conditions.

Figure 5:
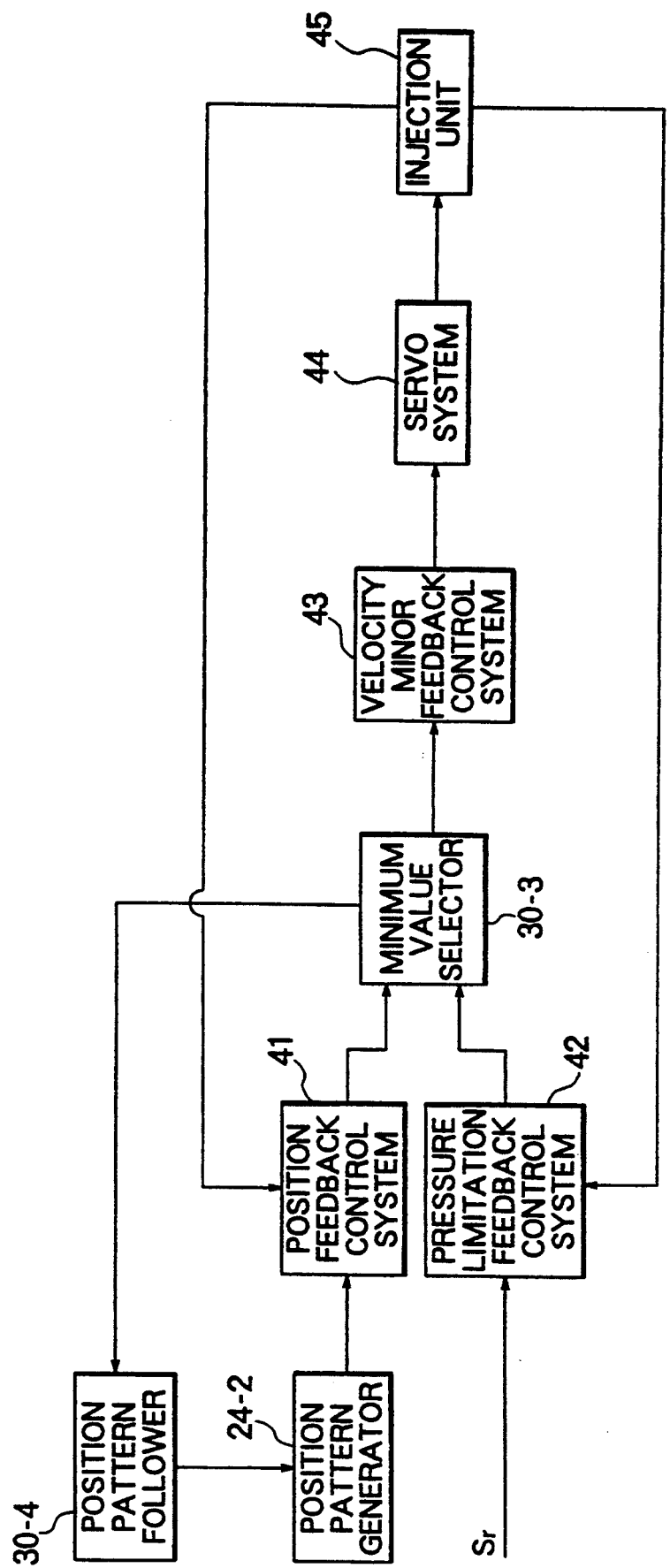
FIG. 5 is a simplified block diagram of the structure illustrated in FIG. 3.

FIG. 5 is a simplified block diagram of the control system which is illustrated in FIG. 3 and which comprises similar parts designated by like reference numerals. In FIG. 5, a position feedback control system 41 comprises a combination of the first subtractor 24-3 and the position control compensator 24-4 both of which are shown in FIG. 3. It may be said that the position feedback control system 41 serves to produce the first manipulated variable y with reference to the position detection signal and the position pattern given from the position detector 25 and the position pattern generator 24-2. On the other hand, a pressure feedback control system 42 comprises a combination of the second subtractor 30-1 and the pressure limitation compensator 30-2 both of which are shown in FIG. 3. It may be said that the pressure feedback control system 42 serves to produce the second manipulated variable q with reference to the pressure detection signal given from the load cell amplifier 18 and the pressure limitation signal Sr. Furthermore, a velocity minor feedback control system 43 is formed by the position detector 25, the amplifier 26, the differentiator 24-1, the third subtractor 24-5, and the velocity control compensator 24-6, all of which are shown in FIG. 3. In addition, a servo system 44 is composed of the servo amplifier 27 and the servo motor 11 while an injection unit 45 is composed of the roller nut 13, the slide base 14, the guide bars 15 and 16, the injection cylinder 20, and the screw 21.

In the first embodiment, description has thus far been made as regards the pressure limitation control carried out during the injection process. However, this invention can also be used to limit the velocity during the holding pressure control and back pressure control. The pressure limitation signal may not be invariable but may be change from one to another over multiple stages.

Figure 6:
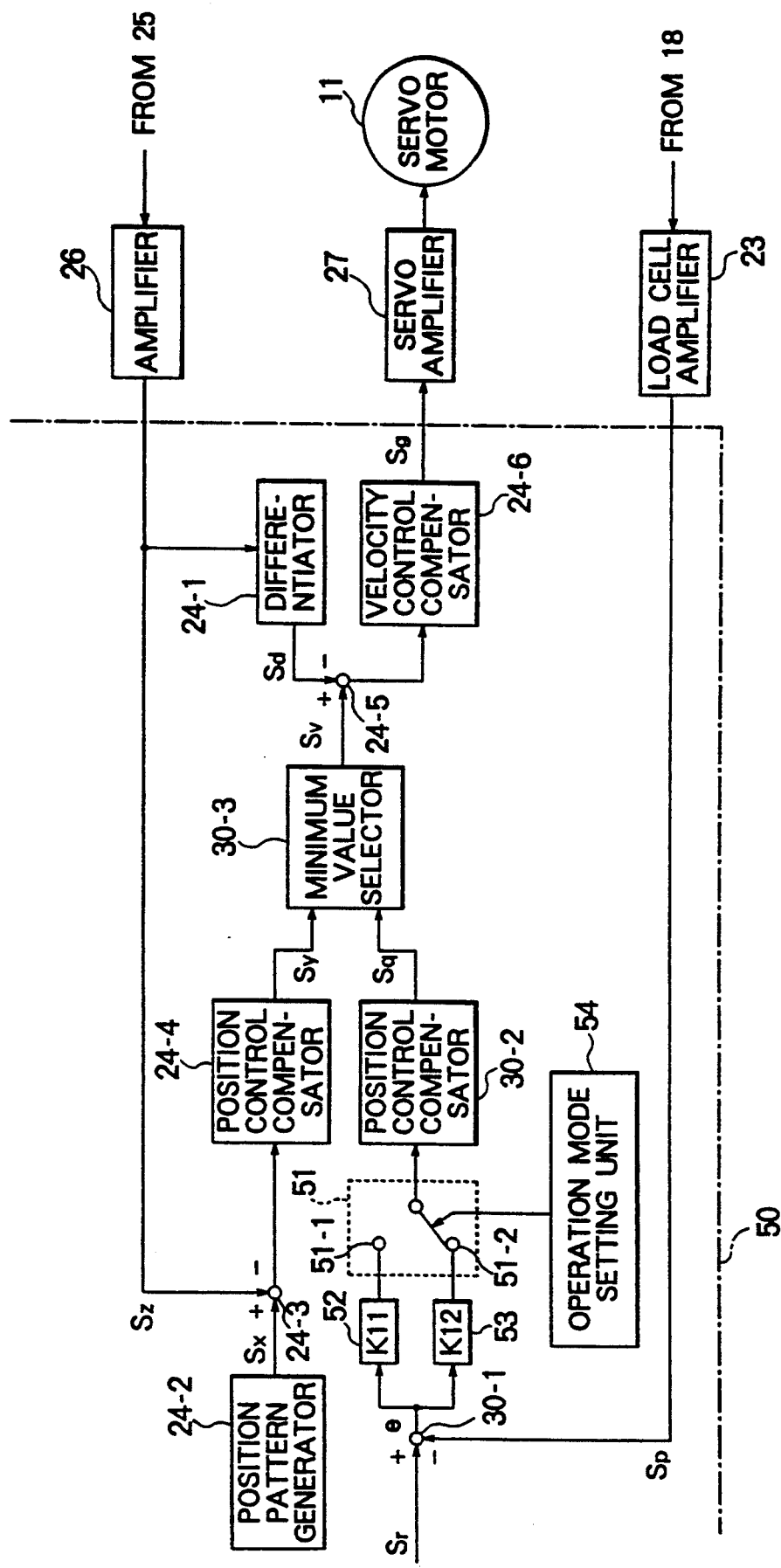
FIG. 6 is a block diagram for describing a structure of a controller of an electrical injection molding machine according to a second embodiment of this invention.

Referring to FIG. 6, description will proceed to a second embodiment of this invention. In FIG. 6, parts and elements similar to those described in FIG. 3 are designated by like reference numerals and symbols. A controller 50 according to this embodiment does not include the position pattern follower 30-4 which is contained in the position feedback control system illustrated in FIG. 3. Instead, a gain adjusting section is arrange between the second subtractor 30-1 for producing the pressure error e and the pressure control compensator 30-2.

The gain adjusting section comprises a changeover switch 51, a pair of parallel proportional compensators 52 and 53 having gains K11 and K12, respectively, and an operation mode setting unit 54. Output terminals of the proportional compensators 52 and 53 are connected to terminals 51-1 and 51-2 of the changeover switch 51 to provide output gains, respectively. The changeover switch 51 selects one of the output gains as a selected gain which is supplied to the pressure limitation compensator 30-2. The operation mode setting unit 54 indicates an operation mode by the operator in correspondence to the molding conditions. The operation mode setting unit 54 produces a mode selection signal corresponding to the operation mode. Supplied with the mode selection signal from the operation mode setting unit 54, the changeover switch 51 switches the terminals from one to another. In the example being illustrated, let the gains K11 and K12 be selected so that K11 is greater than K12.

Now, description will proceed to the control operation carried out during the injection process in the above-mentioned controller 50. For simplicity of the description, the position control compensator 24-4 and the pressure control compensator 30-2 may be formed by proportional compensators having gains K0 and K1, respectively. It is assumed here that, when the changeover switch 51 is connected to the terminal 51-1, the pressure error is equal to e1 and the pressure limitation compensator 30-2 produces a first manipulated variable depicted at q1. Likewise, when the changeover switch 51 is connected to the terminal 51-2, the pressure error is equal to e2 and the pressure limitation compensator 30-2 produces a first manipulated variable depicted at q2. In this event, the following Equations hold:

$$q1 = K1 \cdot K11(r-p),$$

$$q2 = K1 \cdot K12(r-p),$$

$$e1 = q1/K1 \cdot K11,$$

$$e2 = q2/K1 \cdot K12.$$

Let the switching condition (y=q) be given when the manipulated variable y is obtained on the position control for the same injection speed. Under the circumstances, tolerance for the pressure limitation value r is varied in dependence upon the gains K11 and K12 upon switching from the position control to the pressure limitation control. Since K11 is greater than K12, e1 is smaller than e2.

As regards an apparatus of, for example, a direct gate type, which has a small flow resistance against resin, selection of the gain K12 makes occurrence of a surge pressure difficult on switching the control operation from one to another. This is because the switching condition has a large tolerance with respect to the set pressure Sr. On the other hand, the gain K11 may be selected as regards an apparatus having a large flow resistance, which makes a velocity control range wide.

Figure 7:
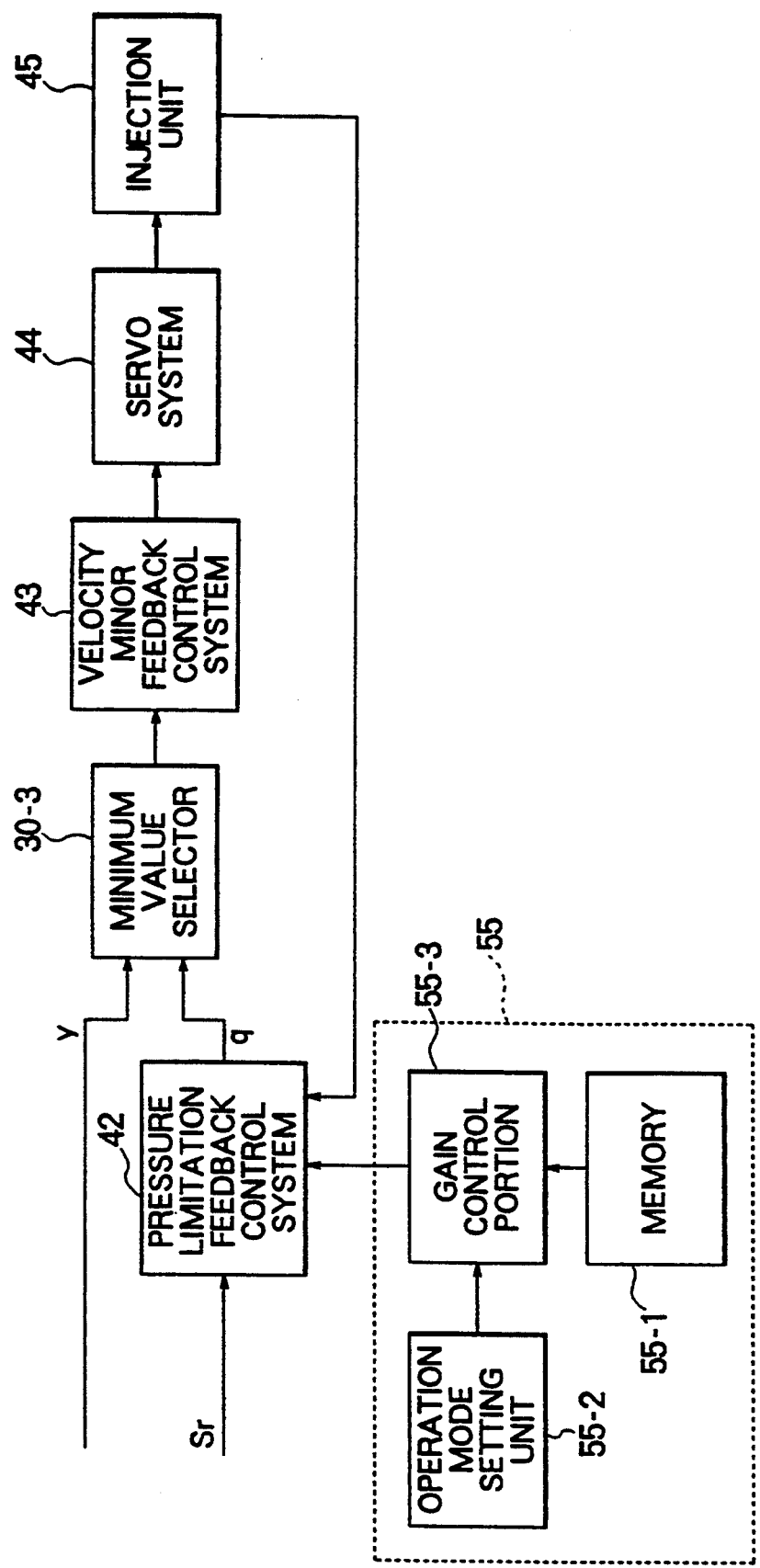
FIG. 7 is a simplified block diagram of the structure illustrated in FIG. 6.

FIG. 7 simplifies the structure illustrated in FIG. 6. Like FIG. 5, the pressure limitation feedback control system 42 comprises the load cell amplifier 18, the second subtractor 30-1, and the pressure limitation compensator 30-2 illustrated in FIG. 6. In FIG. 7, the position feedback control system is not shown which comprises the amplifier 26, the position pattern generator 24-2, the first subtractor 24-3, and the position control compensator 24-4 illustrated in FIG. 6 and which is specified by a line through which the manipulated variable y is sent from the position feedback control system to the minimum value selector 30-3 as a velocity command. In addition, the illustrated velocity minor feedback control system 43 comprises the amplifier 26, the differentiator 24-1, the third subtractor 24-5, and the velocity control compensator 24-6 illustrated in FIG. 6 while the servo system 44 comprises the servo amplifier 27 and the servo motor 11.

In the illustrated example, a gain adjusting section 55 is included which comprises a memory 55-1 for memorizing a plurality of gains corresponding to operation modes. The memory 55-1 may be made to correspond to the proportional compensators 52 and 53 illustrated in FIG. 6. Furthermore, the gain adjusting section 55 comprises an operation mode setting unit 55-2 and a gain control portion 55-3 which may be made to correspond to the operation mode setting unit 54 and the changeover switch 51 in FIG. 6, respectively.

Figure 8:
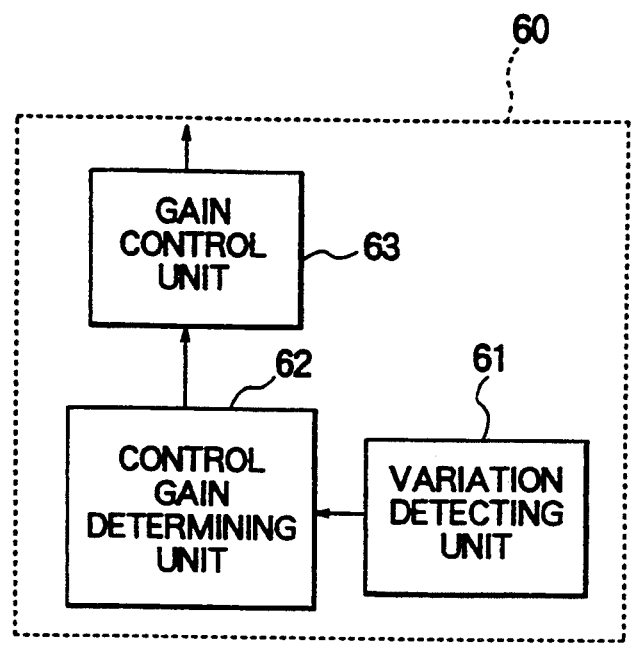
FIG. 8 is a block diagram of a modification of a gain adjuster illustrated in FIG. 7.

Referring to FIG. 8, another gain adjusting section 60 is illustrated which is used instead of the gain adjusting section 55 in FIG. 7. The illustrated gain adjusting section 60 comprises a variation detecting unit 61 for detecting variation of the injection speed or velocity, a control gain determining unit 62 for determining a control gain with reference to the variation of the injection speed, and a gain control unit 63.

The variation detecting unit 61 detects the variation of the injection speed (the magnitude $v$ of the injection speed) during the injection process. The control gain determining unit 62 determines, with reference to the variation of the injection speed, the control gain such that no surge pressure is caused to occur. The control gain is determined, for example, in proportion to a quadratic function $1/(v^2)$ or a linear function $1/v$ of the injection speed. The gain control unit 63 switches the control gain from one to another. As a result, the pressure limitation compensator 30-2 is controlled in accordance with the control gain thus determined in the control gain determining unit 62. With this structure also, it is possible to carry out the pressure limitation control without occurrence of a surge pressure by the use of the gain which is adjusted in consideration of the variation of the injection speed, like the above-mentioned second embodiment.

Figure 9:
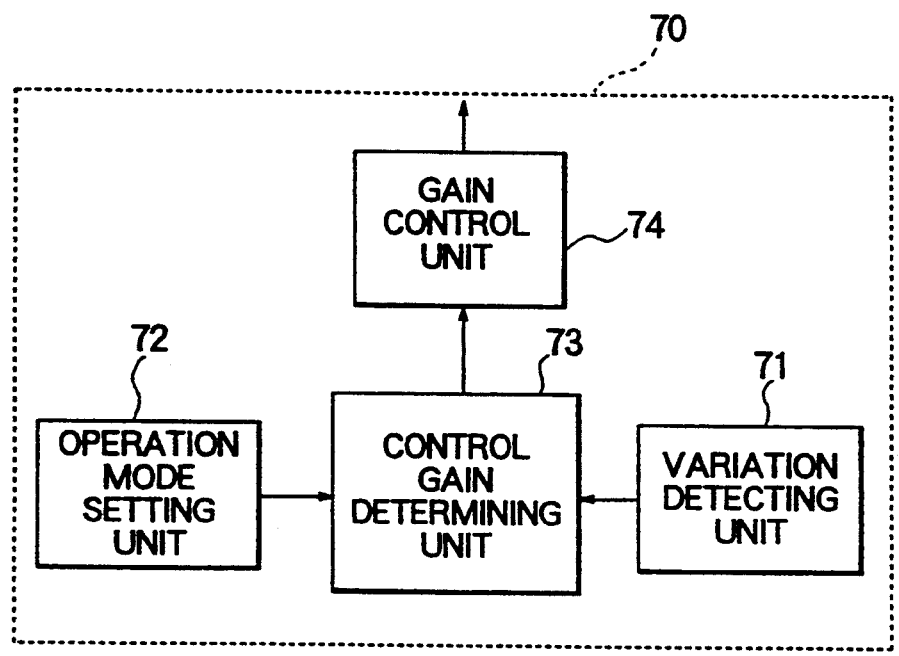
FIG. 9 is a block diagram of a further modification of the gain adjuster illustrated in FIG. 7.

Referring to FIG. 9, another gain adjusting section 70 is applicable to the controller illustrated in FIG. 7 in lieu of the gain adjusting section 55. The illustrated gain adjusting section 70 comprises a variation detecting unit 71 for detecting the variation of the injection speed, an operation mode setting unit 72, a control gain determining unit 73 for selectively determining one of a plurality of the control gains with reference to the variation of the injection speed, and a gain control unit 74. It is assumed here that a plurality of factors for determining the control gain are present in correspondence to the molding conditions. The variation detecting unit 71 detects the variation of the injection speed (the magnitude $v$ of the injection speed) during the injection process. The operation mode setting unit 72 selectively indicates the operation mode in accordance with the molding condition. By the use of the operation mode setting unit 72 selectively set in consideration of the molding condition, the control gain determining unit 73 selectively determines one of the plurality of the control gains in accordance with the variation of the injection speed. The control gain may be determined in proportion to $1/(v^2)$ or $1/v$ like the foregoing description. The gain control unit 74 switches the control gain to be supplied to the pressure limitation compensator 30-2 in accordance with the control gain thus determined by the control gain determining unit 73. With this structure, it is possible to carry out the pressure limitation control without occurrence of a surge pressure by the use of the gain which is selected in consideration of the molding condition and the variation of the injection speed.

What is claimed is:

1. A control unit for use in controlling an injection molding machine which comprises a servo motor controlled by a control signal, a screw driven by said servo motor, a position detector for detecting a position of said screw to produce a position signal representative of said position, and a pressure detector for detecting a pressure imposed on said screw to produce a pressure signal representative of said pressure, said control unit comprising:

a position pattern generator for successively producing a position pattern signal representative of a reference position of said screw concerned with time;

position control means connected to said position detector and said position pattern generator for comparing said position signal value and said position pattern signal to produce a first manipulated variable related to said position;

pressure control means for comparing said pressure signal and a predetermined pressure signal representative of a predetermined pressure to produce a second manipulated variable concerned with said pressure;

a selector connected to both of said position and said pressure control means for selecting a smaller one of said first and said second manipulated variables as a selected manipulated variable; and supply means for supplying said selected manipulated variable to said servo motor as said control signal.

2. A control unit as claimed in claim 1, wherein said supply means comprises:

minor velocity control means supplied with said position signal and said selected manipulated variable for calculating a main manipulated variable of said servo motor from said position signal and said selected manipulated variable; and means for feeding said main manipulated variable as said control signal to said servo motor.

3. A control unit as claimed in claim 1, wherein said selector produces a selection result signal indicative of whether said selected manipulated variable is either said first manipulated variable or said second manipulated variable;

said control unit further comprising:

a position pattern follower connected to said position pattern generator and supplied with said selection result signal for controlling said position pattern generator to change said position pattern signal from one to another in response to said selection result signal.

4. A control unit as claimed in claim 1, wherein said position control means includes:

a first amplifier connected to said position detector for amplifying said position signal to produce a first amplified signal;

a first subtractor connected to said first amplifier and said position pattern generator for comparing said position indicated by said first amplified signal with said reference position to produce a first comparison result signal representative of the result of comparison;

a position control compensator connected to said first subtractor for carrying out a predetermined arithmetic operation on said first comparison result signal to produce a first arithmetic result signal; and means for producing said first arithmetic result signal as said first manipulated variable.

5. A control unit as claimed in claim 4, wherein said pressure control means comprises:

a second amplifier connected to said pressure detector for amplifying said pressure signal to produce a second amplified signal;

a second subtractor connected to said second amplifier and supplied with said predetermined pressure signal for comparing said pressure indicated by said second amplified signal with said predetermined pressure to produce a second comparison result signal representative of the result of comparison; and a pressure limitation compensator connected to said second subtractor for carrying out a preselected arithmetic operation on said second comparison result signal to produce a second arithmetic result signal as said second manipulated variable.

6. A control unit for use in controlling an injection molding machine which comprises a servo motor controlled by a control signal, a screw driven by said servo motor, a position detector for detecting a position of said screw to produce a position signal representative of said position, and a pressure detector for detecting a pressure imposed on said screw to produce a pressure signal representative of said pressure, said control unit comprising:

a position pattern generator for successively producing a position pattern signal representative of a reference position of said screw concerned with time;

position control means connected to said position detector and said position pattern generator for comparing said position signal value and said position pattern signal to produce a first manipulated variable related to said position;

pressure control means for comparing said pressure signal and a predetermined pressure signal representative of a predetermined pressure to produce a second manipulated variable concerned with said pressure:

a selector connected to both of said position and said pressure control means for selecting a smaller one of said first and said second manipulated variables as a selected manipulated variable; and supply means for supplying said selected manipulated variable to said servo motor as said control signal;

said pressure control means comprising:

subtracting means for subtracting said predetermined pressure signal from said pressure signal to produce a difference signal representative of a difference between said pressure and said predetermined pressure; and gain adjusting means, having a plurality of gains different from one another, for adjusting said second manipulated variable in response to said difference signal by switching the gain of said gain adjusting means from one to another.

7. A control unit as claimed in claim 6, wherein said gain adjusting means comprises:

a plurality of gain control units having said gains for controlling said difference signal in accordance with said gains, respectively;

selecting means coupled to said gain control units for selecting one of said gain control units; and operation mode setting means for controlling said selecting means to make said selecting means select one of said gain control units.

8. A control unit as claimed in claim 6, wherein said position control means includes:

a first amplifier connected to said position detector for amplifying said position signal to produce a first amplified signal;

a first subtractor connected to said first amplifier and said position pattern generator for comparing said position indicated by said first amplified signal with said reference position to produce a first comparison result signal representative of the result of comparison;

a position control compensator connected to said first subtractor for carrying out a predetermined arithmetic operation on said first comparison result signal to produce a first arithmetic result signal; and means for producing said first arithmetic result signal as said first manipulated variable.

9. A control unit as claimed in claim 8, wherein said pressure control means comprises:

a second amplifier connected to said pressure detector for amplifying said pressure signal to produce a second amplified signal;

a second subtractor connected to said second amplifier and supplied with said predetermined pressure signal for comparing said pressure indicated by said second amplified signal with said predetermined pressure to produce a second comparison result signal representative of the result of comparison; and a pressure limitation compensator connected to said second subtractor for carrying out a preselected arithmetic operation on said second comparison result signal to produce a second arithmetic result signal as said second manipulated variable.

10. A control unit as claimed in claim 6, wherein said gain adjusting means comprises:

detecting means for detecting variation of an injection speed during an injection process;

determining means for determining a gain of said second manipulated variable in correspondence to the variation of said injection speed; and gain control means coupled to said subtracting means for gain controlling the second manipulated signal in accordance with said gain determined by said determining means.

* * * * *

UNITED STATES PATENT AND TRADEMARK OFFICE
CERTIFICATE OF CORRECTION

PATENT NO. : 5,371,450
DATED : December 6, 1994
INVENTOR(S) : Kazuo HIRAOKA

It is certified that error appears in the above-indentified patent and that said Letters Patent is hereby corrected as shown below:

In Column 10, line 3, delete "arrange" and insert -- arranged --.

Signed and Sealed this

Ninth Day of May, 1995

Attest:

BRUCE LEHMAN

*Attesting Officer*          *Commissioner of Patents and Trademarks*